(No Model.)
I. HARDEE.
ROTARY STOCK CUTTER.
No. 492,675. Patented Feb. 28, 1893.
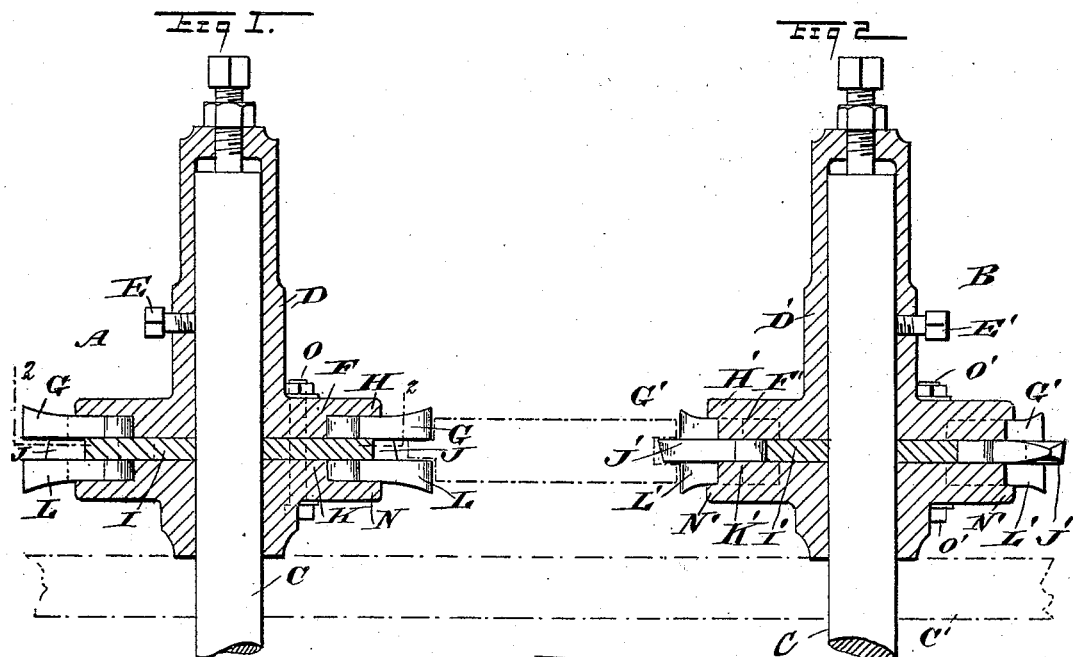
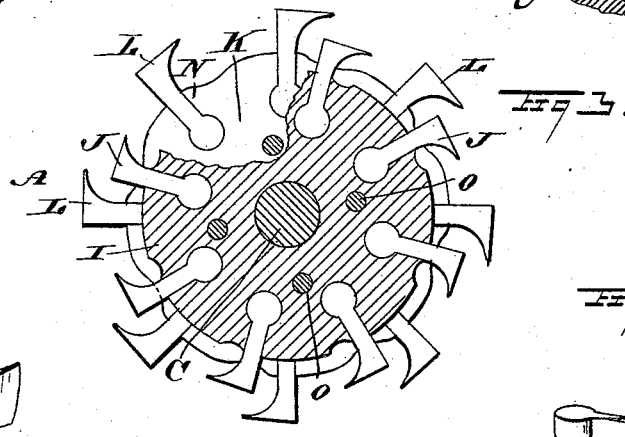
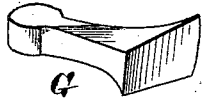
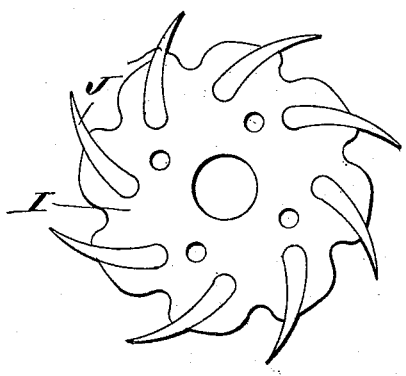
WITNESSES:
H. Walker
E. M. Clark
INVENTOR
Isaiah Hardee
BY
ATTORNEYS.
THE NORRIS PETERS CO., PHOTO-LITHO., WASHINGTON, D. C.

UNITED STATES PATENT OFFICE.

ISAIAH HARDEE, OF BURKE, TEXAS.

ROTARY STOCK-CUTTER.

SPECIFICATION forming part of Letters Patent No. 492,675, dated February 28, 1893.

Application filed June 11, 1892. Serial No. 436,323. (No model.)

*To all whom it may concern:*

Be it known that I, ISAIAH HARDEE, of Burke, in the county of Angelina and State of Texas, have invented certain new and useful Improvements in Rotary Stock-Cutters, of which the following is a full, clear, and exact description.

The invention relates to wood working machinery, and its object is to provide certain new and useful improvements in rotary stock cutters, adapted for use as matcher heads, ship lap heads, and ogee bats.

The invention consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1 is a central vertical section of one of the cutter heads; and Fig. 2 is a similar view of the other. Fig. 3 is a horizontal section of one of the heads—on line 2—2 of Fig. 1—a portion being also broken away. Figs. 4 and 5 are perspective views of the cutters proper. Fig. 6 is a plan view of a portion of a cutter-head of modified construction.

As shown in Figs. 1 and 2, the two cutter-heads, A, and B, are arranged parallel to the same plane, their edges being separated by a space equal to the width of the boards to be operated on. (The position of a board passing between the cutters is indicated by parallel dotted lines.) The head A is mounted on a spindle, C, and the head B on a parallel spindle, C', to which spindles rotation is imparted by suitable means. On the spindle C is clamped the hub D of the head A, by means of a set screw E and on the lower end of the hub D is formed a disk F, in which are set cutters G placed equi-distant apart and projecting a suitable distance from the periphery of the disk F as will be readily understood by reference to Fig. 3.

The top surfaces of the cutters G are engaged or abut against the under side of an annular flange H formed on the disk F, so that an upward movement of the cutters G is prevented. The under surfaces of the cutters G are engaged by a disk I containing a series of cutters J placed alternately with the cutters G and having their top surfaces engaged by the disk F, so as to prevent upward movement of the same. The lower surfaces of these cutters J are engaged by a disk K containing cutters L arranged in alignment with the cutters G and alternately with the cutters J. The top surface of these cutters L are engaged by the disk I while their lower surfaces abut against the top surfaces of an annular flange N formed on the bottom of the disk K. The several disks K, I, and F are bolted together by bolts O so that the several disks when assembled and fastened in place move with the spindle C and the several cutters held in the said disks are prevented from moving up or down on account of abutting on the adjacent disk as described. It is understood that the cutting ends or edges of the cutters project sufficiently far from the peripheries of the several disks and their flanges so that the said peripheries do not come in contact with the wood to be treated. As shown in Fig. 3, the cutters G and L have their cutting edges widened out from the shanks so that a clear cut is made on the wood. The middle cutter J has its shank flattened somewhat so as to be narrower than its cutting edge to permit the latter to cut freely and smoothly on the board. The cutters G and L project farther outward from the peripheries of their disks than the cutters J, so that when the head A engages one edge of the board under treatment, a tongue is formed thereon, as the top and bottom material of the board is cut away by the cutters G and L, and the tongue is trimmed at its front edge by the cutters J. The head B is similarly arranged, that is, is provided with a hub D' and fastened on the spindle C' by a set screw E' and on this hub is formed a disk F' containing cutters G' held in place on the top by an annular flange H' formed on the disk F'. The middle cutters J' of this head B are held in a disk I' and the lower set of cutters L' are held in a disk K' and abut on their under surfaces on an annular flange N' formed on the said disk K'. The several disks are fastened by bolts O' similar to the ones above described, with reference to the head A. The cutters G' and L' of this head B do not project outwardly as far as the cutters J', which latter are somewhat wider than the cutters J and are arranged directly opposite the same, and serve to form the groove in the opposite edge of the board under treatment. The cutters G' and L' penetrate the outer surface of this edge of the board, as will be readily understood by reference to Fig. 1. Now, it will be seen that when a board is passed between the two heads A and B, and the latter are revolving then a tongue is formed on one edge of the board by the three sets of cutters G, J, L, and a groove is formed on the opposite edge of the board by the sets of cutters G', J', L', and at the same time, the entire outer edge of the board is left in a smooth, clean, cut condition.

I do not limit myself to the particular form or shape of the cutters for the several section disks, as they may be varied according to the size and shape of the tongue and grooves to be formed. For general matching boards, however, the width of the cutters J is somewhat less than the width of the cutters J', so that the groove formed on one edge of the board is slightly larger than the tongue formed on the opposite edge so that the boards will readily match. The same is true in regard to the depth of the groove and tongue.

It is understood that a large number of cutters are arranged in each disk, so that the latter cut similarly to a circular saw, and as the cutting edges of the several sets of cutters in each head follow each other closely, a clean, smooth cut is made on the edge of the board. In case any one of the cutters in one of the sections gets worn out or broken it can be readily removed by removing the bolts O' and taking the several sections or disks apart on the spindle C'. The respective cutter can then be lifted out of its seat, as will be readily understood by reference to Figs. 2 and 5.

The several cutters are embedded in seats in the different sections or disks, the seats being arranged in a circle the center of which is in the axis of the spindles and as the seats are all alike in shape, the several cutters for one section or disk, can be readily interchanged so as to permit of using the cutters of one head on that of another head if desired.

It will further be seen that by this special construction, the cutters can be used for right or left hand heads and consequently can be adapted for all kinds of work. The rotary stock cutters, as above described and shown in the drawings, are arranged as matcher heads, but in order to make ship lap heads, the top sections are removed and are interchanged in such a manner that the top disk F' with its cutters G' is placed on the spindle C and the disk F with its cutters G is placed on the spindle C' and the several sections are then fastened together by the bolts O and O'. By changing the cutters G, G' in the top sections F, F' and using other forms of cutters, ogee bats are produced. Thus it will be seen that by interchanging the several sections of the heads or changing the form of the cutters, the rotary stock cutters can be utilized for various purposes as described.

Having thus fully described my invention, I claim as new and desire to secure by Letters Patent—

1. A rotary stock cutter comprising a hub adapted to be secured to a spindle, a disk formed on the said hub and provided with a flange, a set of cutters seated in the said disk and abutting against the said flange, a middle disk placed on the said first named disk and containing a set of cutters arranged alternately with the cutters of the said first named disk, and a third disk fitting onto the middle or second disk and also provided with a flange or sets of cutters substantially as shown and described.

2. A rotary stock cutter comprising a hub adapted to be secured to a spindle, a disk formed on the said hub and provided with a flange, a set of cutters seated in the said disk and abutting against the said flange, a middle disk placed on the said first named disk and containing a set of cutters arranged alternately with the cutters of the said first named disk and a third disk fitting onto the middle or second disk and also provided with a flange or set of cutters and bolts for fastening the several disks together, as set forth.

ISAIAH HARDEE.

Witnesses:
E. B. ROBB,
W. S. ROGERS.